(12) United States Patent
Farnsworth et al.

(10) Patent No.: US 7,835,527 B2
(45) Date of Patent: *Nov. 16, 2010

(54) METHODS AND APPARATUS FOR REDUCING AIRLINK CONGESTION AND PROCESSING TIME ASSOCIATED WITH CIPHERING INFORMATION IN A WIRELESS NETWORK

(75) Inventors: Andrew John Farnsworth, Bromsgrove (GB); Mark Dennis Norton, Bromsgrove (GB)

(73) Assignee: Research In Motion Limited, Waterloo, Ontario (CA)

( * ) Notice: Subject to any disclaimer, the term of this patent is extended or adjusted under 35 U.S.C. 154(b) by 269 days.

This patent is subject to a terminal disclaimer.

(21) Appl. No.: 12/243,623

(22) Filed: Oct. 1, 2008

(65) Prior Publication Data

US 2009/0022316 A1 Jan. 22, 2009

Related U.S. Application Data

(63) Continuation of application No. 10/950,089, filed on Sep. 24, 2004, now Pat. No. 7,450,721.

(51) Int. Cl.
*H04L 9/12* (2006.01)
(52) U.S. Cl. .................................... 380/270; 380/255
(58) Field of Classification Search .................. 380/255
See application file for complete search history.

(56) References Cited

U.S. PATENT DOCUMENTS

| | | | |
|---|---|---|---|
| 7,197,145 B2 | 3/2007 | Yi | |
| 2002/0164029 A1 | 11/2002 | Jiang | |
| 2003/0035545 A1 | 2/2003 | Jiang | |
| 2003/0076859 A1 | 4/2003 | Jiang | |
| 2004/0039910 A1 | 2/2004 | Isokangas et al. | |
| 2005/0101298 A1 | 5/2005 | Norton et al. | |
| 2005/0276417 A1 | 12/2005 | Funnell | |
| 2006/0030294 A1 | 2/2006 | Funnell et al. | |

OTHER PUBLICATIONS

"Universal Mobile Telecommunications System (UMTS); Radio Resource Control (RRC) Protocol Specification (3GPP TS 25.331 version 3.14.0 release 1999); ETSI TS 125331", ETSI Standards, European Telecommunications Standards Institute, Mar. 2003, p. 85-226, XP-002317004.

European Search Report for Application #04255844.5-1249, Mar. 30, 2005.

*Primary Examiner*—Matthew B Smithers
(74) *Attorney, Agent, or Firm*—John J. Oskorep, Esq.

(57) ABSTRACT

One illustrative method involves the steps of receiving a ciphering mode information message from a wireless network; identifying and processing valid radio bearer downlink ciphering activation time information in the ciphering mode information message when it is part of a security mode command message; and refraining from processing any valid radio bearer downlink ciphering activation time information in the ciphering mode information message when it is part of a message that is different from the security mode command message (i.e. when it is part of a radio network subsystem relocation procedure). The method may include the additional steps of producing valid radio bearer uplink ciphering activation time information for inclusion within a response message when the ciphering mode information message is part of the security mode command message; refraining from producing any valid radio bearer uplink ciphering activation time information when the ciphering mode information message is part of a message that is different from the security mode command message; and causing the response message to be sent to the wireless network.

15 Claims, 4 Drawing Sheets

| | 11010010 | 01001101 | 11111001 | ... |

| | 11010010 | 00000100 | 11111000 | 11001100 | ... |

400

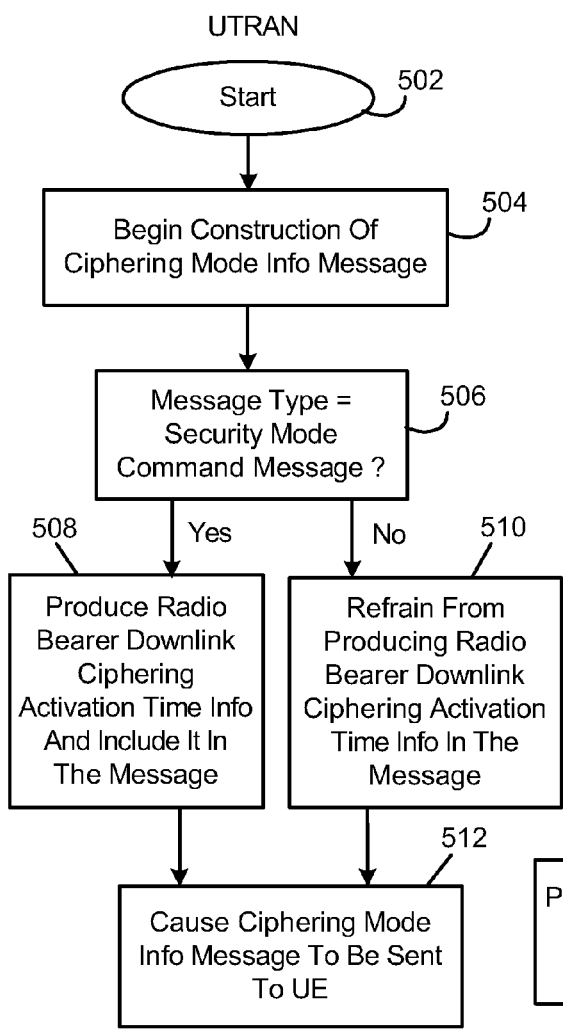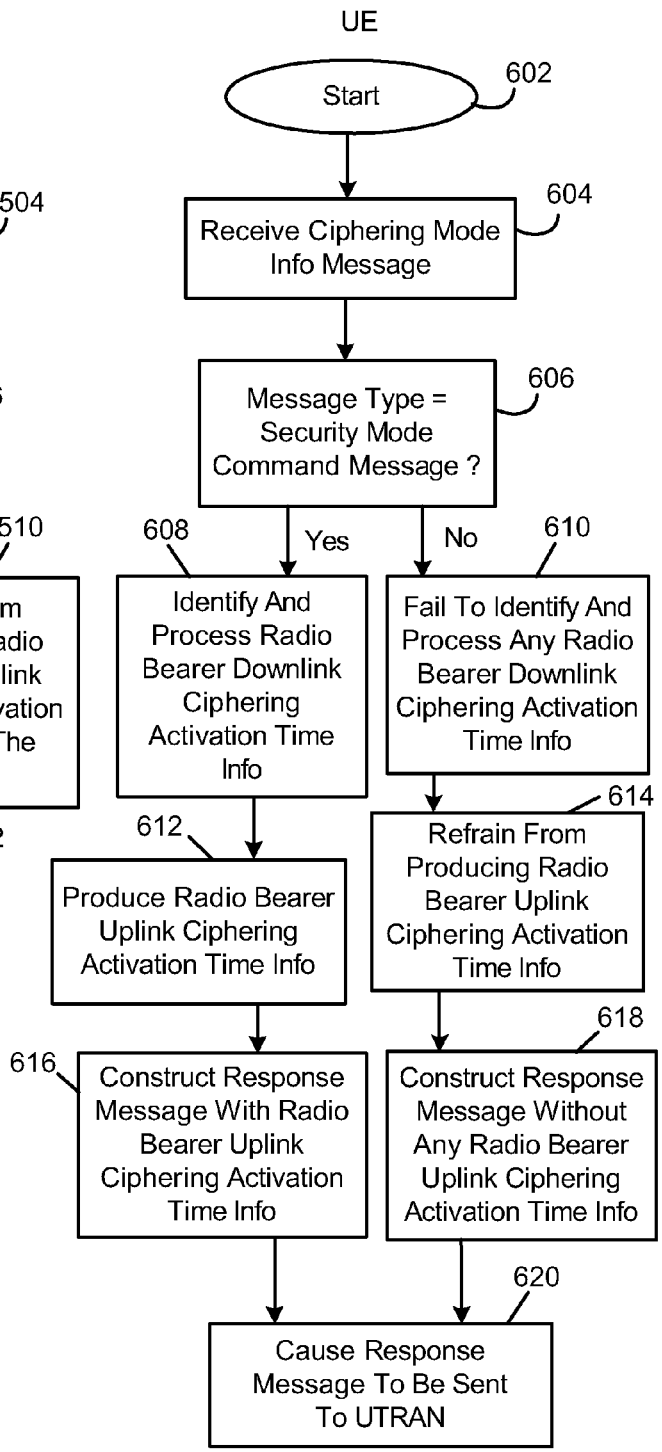

METHODS AND APPARATUS FOR REDUCING AIRLINK CONGESTION AND PROCESSING TIME ASSOCIATED WITH CIPHERING INFORMATION IN A WIRELESS NETWORK

CROSS-REFERENCE TO RELATED APPLICATION

This patent application is a continuation of and claims priority to U.S. non-provisional patent application having application Ser. No. 10/950,089 and filing date of 24 Sep. 2004, now U.S. Pat. No. 7,450,721, which is hereby incorporated by reference herein.

BACKGROUND

1. Field of the Technology

The present application relates generally to mobile stations operating in wireless communication networks, and more particularly to methods and apparatus for use in reducing airlink congestion and processing time associated with ciphering information in the wireless network.

2. Description of the Related Art

A wireless communication device, such as a mobile station operating in a wireless communication network, may provide for both voice telephony and packet data communications. A mobile station may, for example, be compatible with $3^{rd}$ Generation (3 G) communication standards and utilize Global System for Mobile Communications (GSM), Time Division Multiple Access (TDMA), or Code Division Multiple Access (CDMA) wireless network technologies. The $3^{rd}$ Generation Partnership Project (3GPP) specification 25.331 (Radio Resource Control (RRC) protocol specification) describes the processing of information elements (IEs) that are included in protocol messages. Section 8.6.3.4 of this specification describes the processing of IEs called "Ciphering Mode Information". This section describes an IE called "Radio Bearer Downlink Ciphering Activation Time Information" which is optional within the Ciphering Mode Information. Such information is communicated between the wireless network and the mobile station and is suitably processed by both entities for establishing appropriate communication therebetween.

It is highly desirable to discover ways in which to reduce airlink congestion and processing time of control information communicated between the wireless network and the mobile station. Accordingly, what are needed are methods and apparatus for use in reducing airlink congestion and processing time associated with ciphering information.

BRIEF DESCRIPTION OF THE DRAWINGS

Embodiments of present application techniques will now be described by way of example with reference to attached figures, wherein:

FIG. 3 is a simplified illustrative representation of a ciphering mode information message sent from the wireless network to the mobile station which may include radio bearer downlink ciphering activation time information;

FIG. 4 is a simplified illustrative representation of a response message sent from the mobile station to the wireless network which may include radio bearer uplink ciphering activation time information;

FIG. 5 is a flowchart for describing a wireless network method for use in reducing airlink congestion and processing time associated with ciphering information; and FIG. 6 is a flowchart for describing a mobile station method for use in reducing airlink congestion and processing time associated with ciphering information.

DETAILED DESCRIPTION OF THE PREFERRED EMBODIMENTS

From the standpoint of the mobile station, one illustrative method of the present application involves the steps of receiving a ciphering mode information message from a wireless network; identifying and processing valid radio bearer downlink ciphering activation time information in the ciphering mode information message when it is part of a security mode command message; and refraining from processing any valid radio bearer downlink ciphering activation time information in the ciphering mode information message when it is part of a message that is different from the security mode command message (i.e. not part of any security mode command message). For messages different from the security mode command message, no valid radio bearer downlink ciphering activation time information need even be sent from the wireless network. The method may include the additional steps of producing valid radio bearer uplink ciphering activation time information for inclusion within a response message when the ciphering mode information message is part of the security mode command message; refraining from producing any valid radio bearer uplink ciphering activation time information when the ciphering mode information message is different from the security mode command message (i.e. not part of any security mode command message); and causing the response message to be sent to the wireless network. From the standpoint of the wireless network, one illustrative method of the present application involves the steps of producing a ciphering mode information message for a mobile station; populating the ciphering mode information message with valid radio bearer downlink ciphering activation time information when it is part of a security mode command message; refraining from populating the ciphering mode information message with any valid radio bearer downlink ciphering activation time information when it is part of a message that is different from the security mode command message (i.e. not part of any security mode command message); and causing the ciphering mode information message to be sent to the mobile station. Advantageously, airlink congestion and processing time associated with ciphering information communicated between a wireless network and a mobile station are reduced.

Figure 1:
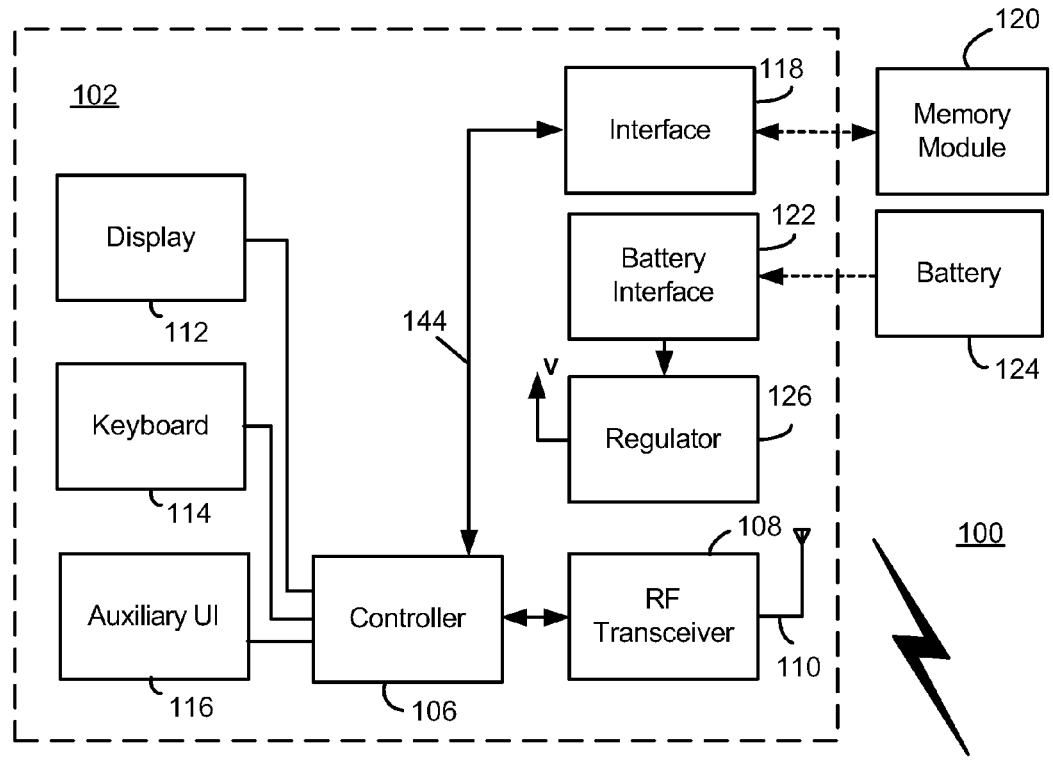
FIG. 1 is a block diagram which illustrates pertinent components of a mobile station and a wireless communication network.
Figure 1:
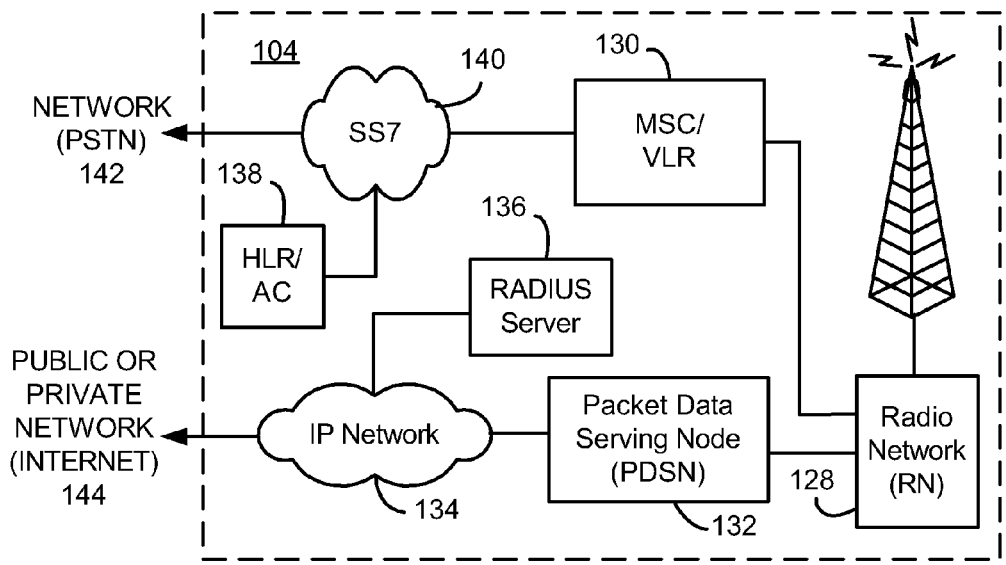

FIG. 1 is a block diagram of a communication system 100, which includes a mobile station 102, which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to a radio frequency (RF) transceiver circuitry 108 (i.e. a wireless transceiver) and an antenna 110. Typically, controller 106 is embodied as a central processing unit (CPU), which runs operating system software in a memory component (not shown). Controller 106 will normally control overall operation of mobile station 102, whereas signal-processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device, providing an output having a regulated voltage V. Mobile station 102 also operates using a memory module 120, such as a Universal Subscriber Identity Module (USIM) for a UMTS network, which is connected to or inserted in mobile station 102 at an interface 118. Memory module 120 could alternatively be, for example, a Subscriber Identity Module (SIM) or a Removable User Identity Module (R-UIM).

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3 G) supported network based on Code Division Multiple Access (CDMA) technologies. In particular, wireless network 104 is a cdma2000™ network which includes fixed network components coupled as shown in FIG. 1. Cdma2000™ is a trademark of the Telecommunications Industry Association (TIA). Wireless network 104 of the cdma2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. The wireless network may be a Universal Terrestrial Radio Access Network (UTRAN). SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128, which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile stations 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. HLR/AC 138 also authenticates mobile station 102 on system access.

In order to provide packet data services to mobile station 102 in a cdma2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
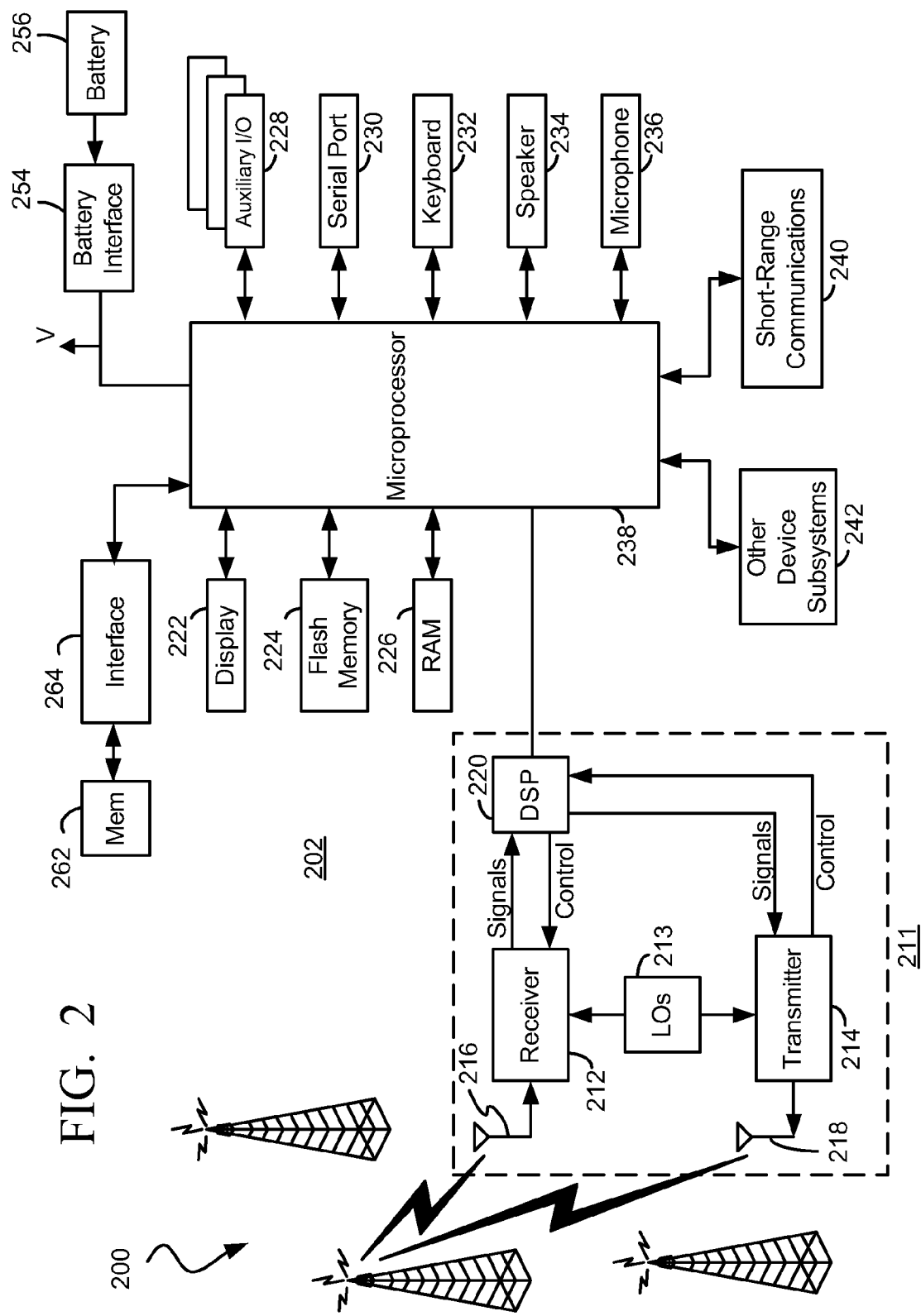
FIG. 2 is a more detailed diagram of a preferred mobile station of FIG. 1.

FIG. 2 is a detailed block diagram of a preferred mobile station 202 utilized in the present application. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 (i.e. wireless transceiver) and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Universal Subscriber Identity Module (USIM) for a UMTS network, to be inserted in or connected to an interface 264 of mobile station 202 in order to operate in the network. Memory module 262 could alternatively be, for example, a Subscriber Identity Module (SIM) or a Removable User Identity Module (R-UIM). Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown) which regulates power to all of the circuitry, providing an output having a regulated voltage V.

Microprocessor 238, which is one implementation of controller 106 of FIG. 1, controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown).

Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications, which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and memory module 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component, which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

The 3$^{rd}$ Generation Partnership Project (3GPP) specification 25.331 (Radio Resource Control (RRC) protocol specification) describes the processing of Information Elements (IEs) that are included in protocol messages. This well-known publicly-available technical specification is hereby incorporated by reference herein and describes in detail the environment, context, and processes associated with the present application. Section 8.6.3.4 of this technical specification describes the processing of IEs called "Ciphering Mode Information". This section describes an IE called "Radio Bearer Downlink Ciphering Activation Time Information" which is optional within the Ciphering Mode Information. Such information is communicated between the wireless network (e.g. the UTRAN or Universal Terrestrial Radio Access Network) and the mobile station (e.g. the UE or User Equipment) and is suitably processed by both entities for establishing appropriate communication therebetween. However, it is highly desirable to discover ways in which to reduce airlink congestion and processing time of control information communicated between the wireless network and the mobile station.

Section 8.6.3.4 of Specification 25.331, v3.14.0 states in part that

2> if the IE "Radio bearer downlink ciphering activation time info" is present:
   3> apply the following procedure for each radio bearer and signalling radio bearers using RLC-AM or RLC-UM indicated by the IE "RB identity":
      4> suspend uplink transmission on the radio bearer or the signalling radio bearer (except for the SRB where the response message is transmitted) according to the following:
         5> do not transmit RLC PDUs with sequence number greater than or equal to the uplink activation time, where the uplink activation time is selected according to the rules below.
      4> select an "RLC sequence number" at which (activation) time the new ciphering configuration shall be applied in uplink for that radio bearer according to the following:
         5> consider a ciphering activation time in uplink to be pending until the RLC sequence number of the next RLC PDU to be transmitted for the first time is equal to or larger than the selected activation time;
         5> for each radio bearer and signalling radio bearer that has no pending ciphering activation time in uplink as set by a previous procedure changing the security configuration:
            6> set a suitable value that would ensure a minimised delay in the change to the latest ciphering configuration.
         5> for each radio bearer and signalling radio bearer that has a pending ciphering activation time in uplink as set by a previous procedure changing the security configuration:
            6> for radio bearers and signalling radio bearers except SRB2:
               7>set the same value as the pending ciphering activation time.
            6> for signalling radio bearer SRB2:
               7> set a suitable value that would ensure a minimised delay in the change to the latest ciphering configuration.
      4> store the selected "RLC sequence number" for that radio bearer in the entry for the radio bearer in the variable RB_UPLINK_CIPHERING_ACTIVATION_TIME_INFO;

where RLC=Radio Link Control, RB=Radio Bearer, AM=Acknowledged Mode, UM=Unacknowledged Mode, and PDUs=Protocol Data Units. Note that the above section generally describes that if the "Radio Bearer Downlink Ciphering Activation Time Info" IE is present in a ciphering mode information message from the UTRAN, an uplink activation time should be derived by the UE for each RB using AM or UM, and that time should be added to a list called RB_UPLINK_CIPHERING_ACTIVATION_TIME_INFO. Here, the term "time" is what is known as an "RLC Sequence Number".

In Section 8.2.2.3 it states that:
1> if the received reconfiguration message contained the IE "Ciphering mode info":
   2> include and set the IE "Radio bearer uplink ciphering activation time info" to the value of the variable RB_UPLINK_CIPHERING_ACTIVATION_TIME_INFO.

The above description means that the list mentioned earlier needs to be provided in a "response message" from the UE to the UTRAN when a reconfiguration message which includes "Ciphering Mode Info" IE is sent.

Continuing with Section 8.2.2.5, it states that:

If UTRAN has ordered a ciphering reconfiguration by including the IE "Ciphering mode info", UTRAN should:
1> for radio bearers using RLC-AM or RLC-UM:
2> use the old ciphering configuration for received RLC PDUs with RLC sequence number less than the RLC sequence number indicated in the IE "Radio bearer uplink ciphering activation time info" sent by the UE;
2> use the new ciphering configuration for received RLC PDUs with RLC sequence number greater than or equal to the RLC sequence number indicated in the IE "Radio bearer uplink ciphering activation time info" sent by the UE;
2> if an RLC reset or re-establishment occurs after this response message has been received by UTRAN before the activation time for the new ciphering configuration has been reached:
3> ignore the activation time; and
3> apply the new ciphering configuration immediately after the RLC reset or RLC re-establishment.

The above description instructs the UTRAN to use those "times" returned in the list. Note especially the last three clauses in the above description.

In Section 8.2.2.3 there are further clauses that state:

NOTE: UTRAN should not include the IE "Ciphering mode info" in any reconfiguration message unless it is also used to perform an SRNS relocation with change of ciphering algorithm.

and

The UE shall transmit a response message as specified in subclause 8.2.2.4, setting the information elements as specified below. The UE shall:
1> if the received reconfiguration message included the IE "Downlink counter synchronisation info"; or
1> if the received reconfiguration message is a RADIO BEARER RECONFIGURATION and the IE "New URNTI" is included:
2> re-establish RB2 where SRNS=Serving Radio Network Subsystem, and URNTI=UTRAN Radio Network Temporary Identity. Further in 8.2.2.4 it states that If the new state is CELL_DCH or CELL_FACH, the response message shall be transmitted using the new configuration after the state transition, and the UE shall:
1> if the IE "Downlink counter synchronisation info" was included in reconfiguration message; or if the received reconfiguration message is a RADIO BEARER RECONFIGURATION and the IE "New URNTI" is included:
2> when RLC has confirmed the successful transmission of the response message:
3> re-establish all AM and UM RLC entities with RB identities larger than 4 and set the first 20 bits of all the HFN component of the respective COUNT-C values to the START value included in the response message for the corresponding CN domain;
3> re-establish the RLC entities with RB identities 1, 3 and 4 and set the first 20 bits of all the HFN component of the respective COUNT-C values to the START value included in the response message for the CN domain stored in the variable LATEST_CONFIGURED_CN_DOMAIN.

where CN=Core Network and HFN=HyperFrame Number.

As apparent, the NOTE above indicates that Ciphering Mode Info should only be included when an SRNS relocation is taking place for a reconfiguration message. When an SRNS relocation procedure is taking place, which typically occurs when the SRNS for the mobile station is being changed to another RNS due to a change in the geographic location of the mobile station, the IE "Downlink Counter Synchronisation Info" is always present. As a result, the other clauses above mean that all AM and UM RBs will end up being immediately reestablished. Reviewing the previous clauses from earlier above, reestablishing an RLC used by an RB means that its RLC sequence number is reset to zero—thus the "time" information becomes meaningless.

Thus, taken together it has been shown that the UE is being inefficient in creating the list in RB_UPLINK_CIPHERING_ACTIVATION_TIME_INFO and sending it to the UTRAN. The previously generated "time" information will ultimately end up not being used. Note that the more recent Specification 25.331 v3.15.0 also supports this analysis. RBs are specified as being "stopped" and "continued" as described in 25.331 v3.15.0, so there is little reason to change the ciphering configuration of a "stopped" RB; the updated specification states that the RB should be "continued" after reestablishment.

According to the present application, airlink congestion and processing time associated with ciphering information communicated between a wireless communication network and a mobile station are reduced with use of the following techniques, which is based on the above showing. To illustrate, FIG. 3 depicts a ciphering mode information message 300 from the UTRAN which may include radio bearer downlink ciphering activation information 302. On the other hand, FIG. 4 depicts a response message 400 from the UE which may include radio bearer uplink ciphering activation information 402. Response message 400 is sent from the UE to the UTRAN in response to receiving ciphering mode information message 300 from the UTRAN.

According to one aspect of the present application, ciphering mode information message 300 includes valid radio bearer downlink ciphering activation information 302 only when message 300 is part of a Security Mode Command Message; for all other messages no valid radio bearer downlink ciphering activation information is provided. Note that message 300 is never part of a Security Mode Command Message during a Serving Radio Network Subsystem (SRNS) relocation for the mobile station, the case in which the ciphering activation information is not ultimately utilized as intended. Thus, ciphering mode information message 300 is sent from the UTRAN to the UE with valid radio bearer downlink ciphering activation information 302 when message 300 is part of a Security Mode Command Message, but without valid radio bearer downlink ciphering activation information 302 when message 300 is part of a message that is different from the Security Mode Command Message. In the UE, valid radio bearer downlink ciphering activation information 302 is received and processed when message 300 is part of the Security Mode Command Message, but no valid radio bearer downlink ciphering activation information 302 is processed (and perhaps never even received) when message 300 is part of a message that is different from the Security Mode Command Message. Further, the UE will generate valid radio bearer uplink ciphering activation time information 402 for inclusion within response message 400 when the ciphering mode information message 300 is part of the Security Mode Command Message, but refrain from producing any valid radio bearer uplink ciphering activation time information 402 when ciphering mode information message 300 is part of a message different from the Security Mode Command Message.

FIG. 5 is a flowchart for describing a "wireless network" method of reducing airlink congestion and processing time associated with ciphering information communicated between a wireless communication network and a mobile station operating in the wireless network. The method of FIG. 5 may be implemented in one or more network processors in the wireless network (e.g. the UTRAN). The method may be further implemented as a computer program product which includes a storage medium and computer instructions stored in the storage medium which are executable by one or more network processors to perform the method as described.

Beginning at a start block 502 of FIG. 5, the UTRAN begins construction of a ciphering mode information message which is to be sent to a UE (step 504 of FIG. 5). This typically needs to occur when the ciphering configuration is to be setup or changed. If the UTRAN identifies that the ciphering mode information message is part of a Security Mode Command Message (step 506 of FIG. 5), then step 508 is performed; otherwise step 510 is performed. A Security Mode Command Message is typically sent to a UE in the event where an initial ciphering configuration is to be provided or a new configuration established; however a Security Mode Command Message is never part of an SRNS relocation procedure for the mobile station.

In step 508 of FIG. 5, the UTRAN produces valid radio bearer downlink ciphering activation time information for inclusion within the ciphering mode information message (step 508). This activation time information includes what are known as Radio Link Control (RLC) Sequence Numbers. Being "valid", this information is produced in accordance with conventional techniques as outlined in the current technical specification. In step 510 of FIG. 5, however, the UTRAN refrains from producing the radio bearer downlink ciphering activation time information that it would otherwise normally produce in step 508. Since no valid information is produced, no valid radio bearer downlink ciphering activation time information is included within the ciphering mode information message in step 510. Preferably, no radio bearer downlink ciphering activation time information is provided within the message at all, so that airlink congestion is reduced. After either step 508 or step 510 is performed, the UTRAN causes the ciphering mode information message to be sent to the UE over the wireless link (step 512 of FIG. 5).

FIG. 6 is a flowchart for describing a "mobile station" method of reducing airlink congestion and processing time associated with ciphering information communicated between a wireless communication network and a mobile station operating in the wireless network. This method typically follows the steps performed by the UTRAN as described in FIG. 5. Alternatively, however, the method of FIG. 5 need not be followed where the UE receives valid radio bearer downlink ciphering activation time information as part of messages that are different from Security Mode Command Messages. The method of FIG. 6 may be performed by one or processors of the mobile station (e.g. the UE). The method may be further implemented as a computer program product comprising a storage medium and computer instructions stored in the storage medium which are executable by one or more processors for performing the method as described.

Beginning at a start block 602 of FIG. 6, the UE receives a ciphering mode information message from the UTRAN (step 604 of FIG. 6). A ciphering mode information is typically received by the UE when the ciphering configuration is to be setup or changed. If the UE identifies that the ciphering mode information message is part of a Security Mode Command Message (step 606 of FIG. 6), then steps 608, 612, and 616 are performed; otherwise steps 610, 614, and 618 are performed. A Security Mode Command Message is typically received by the UE in the event where an initial ciphering configuration is to be provided or a new configuration established; however a Security Mode Command Message is never part of an SRNS relocation procedure for the mobile station.

Proceeding with step 608 where the message is part of a Security Mode Command Message, the UE identifies and processes valid radio bearer downlink ciphering activation time information within the ciphering mode information message (step 608 of FIG. 6). Specifically, the UE produces valid radio bearer radio bearer uplink ciphering activation time information in response to the message (step 612 of FIG. 6). The activation time information includes what are known as RLC Sequence Numbers. Being "valid", this information is created in accordance with conventional techniques as outlined in the current technical specification. Next, the UE constructs a response message which includes the radio bearer uplink ciphering activation time information within it (step 616 of FIG. 6). The UE then causes this response message to be sent to the UTRAN with use of its wireless transceiver (step 620 of FIG. 6).

Referring back to step 610 where the message is part of a message that is different from a Security Mode Command Message, the UE fails to identify any valid radio bearer downlink ciphering activation time information within the ciphering mode information message and/or refrains from performing any processing related thereto (step 610 of FIG. 6). The UE will fail to identify any valid radio bearer downlink ciphering activation time information in the message in the case where the method of FIG. 5 is followed; alternatively however the UE may receive but ignore the valid radio bearer downlink ciphering activation time information in the message for the case where the method of FIG. 5 is not followed. Preferably, no radio bearer downlink ciphering activation time information is provided or identified within the message at all. In any case, the UE refrains from processing any radio bearer downlink ciphering activation time information, and refrains from producing any valid radio bearer uplink ciphering activation time information in response to the message (step 614 of FIG. 6). The creation of this information would normally be done as in step 612, in accordance with conventional techniques as outlined in the current technical specification. Next, the UE constructs a response message which includes no valid radio bearer uplink ciphering activation time information within it (step 618 of FIG. 6). Preferably, no radio bearer uplink ciphering activation time information is provided within the response message at all so that airlink congestion is reduced. The UE then causes the response message to be sent to the UTRAN with use of its wireless transceiver (step 620 of FIG. 6).

As apparent, airlink congestion and processing time associated with ciphering information communicated between a wireless communication network and a mobile station are reduced. Radio bearer downlink/uplink ciphering activation time information need not be unnecessarily generated or processed by the components, nor do they need to be unnecessarily communicated over the wireless airlink.

From the standpoint of the mobile station, one illustrative method of the present application involves the steps of receiving a ciphering mode information message from a wireless network; identifying and processing valid radio bearer downlink ciphering activation time information in the ciphering mode information message when it is part of a security mode command message; and refraining from processing any valid radio bearer downlink ciphering activation time information in the ciphering mode information message when it is part of a message that is different from the security mode command message (i.e. not part of any security mode command message). For messages different from the security mode command message, no valid radio bearer downlink ciphering activation time information need even be sent from the wireless network. The method may include the additional steps of producing valid radio bearer uplink ciphering activation time information for inclusion within a response message when the ciphering mode information message is part of the security mode command message; refraining from producing any valid radio bearer uplink ciphering activation time information when the ciphering mode information message is different from the security mode command message (i.e. not part of any security mode command message); and causing the response message to be sent to the wireless network. A mobile station of the present application includes a wireless transceiver; an antenna coupled to the wireless transceiver; and one or more processors coupled to the wireless transceiver which are operative to perform the method as described. A computer program product of the present application includes a storage medium and computer instructions stored in the storage medium which are executable by one or more processors for performing the method as described.

From the standpoint of the wireless network, one illustrative method of the present application involves the steps of producing a ciphering mode information message for a mobile station; populating the ciphering mode information message with valid radio bearer downlink ciphering activation time information when it is part of a security mode command message; refraining from populating the ciphering mode information message with any valid radio bearer downlink ciphering activation time information when it is part of a message that is different from the security mode command message (i.e. not part of any security mode command message); and causing the ciphering mode information message to be sent to the mobile station. One or more network processors of a wireless communication network of the present application may be operative to perform the method as described. A computer program product of the present application includes a storage medium and computer instructions stored in the storage medium which are executable by one or more network processors for performing the method.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in reducing processing time associated with ciphering information communicated in a mobile station, the mobile station configurable to operate in a wireless network, the method comprising:

receiving, by the mobile station, a ciphering mode information message originated from the wireless network;

determining that the ciphering mode information message is part of a security mode command message;

identifying and processing radio bearer downlink ciphering activation time information in the ciphering mode information message;

producing radio bearer uplink ciphering activation time information, and, generating a response message to the ciphering mode information message which includes the radio bearer uplink ciphering activation time information;

transmitting the response message; and when the ciphering mode information message is part of a message that is different from a security code command message: refraining from processing radio bearer downlink ciphering activation time information in the ciphering mode information message, and, not producing an associated radio bearer uplink ciphering activation time, and, generating a response message to the non-security-mode-command message which does not include an associated radio bearer uplink ciphering activation time.

2. The method of claim 1, wherein the ciphering mode information message that is part of the message that is different from the security mode command message is received as part of a radio network subsystem relocation procedure for the mobile station.

3. The method of claim 1, further comprising:

failing to receive any valid radio bearer downlink ciphering activation time information in the ciphering mode information message when it is part of the message that is different from the security mode command message.

4. The method of claim 1, further comprising:

when the ciphering mode information message is part of the message that is different from the security mode command message: a radio link control (RLC) of a radio bearer at the mobile station will be reestablished and its RLC sequence number reset to zero.

5. The method of claim 1, wherein the valid radio bearer downlink ciphering activation time information comprises Radio Link Control (RLC) sequence numbers.

6. A mobile station, the mobile station configurable to operate in a wireless network, comprising:

a wireless transceiver;

an antenna coupled to the wireless transceiver;

one or more processors coupled to the wireless transceiver;

the one or more processors being operative to:

receive a ciphering mode information message through the wireless transceiver;

when the ciphering mode information message is part of a security mode command message: identify and process valid radio bearer downlink ciphering activation time information in the ciphering mode information message for producing valid radio bearer uplink ciphering activation time, and generate a response message which includes the valid radio bearer uplink ciphering activation time information configured to be sent through the wireless transceiver; and when the ciphering mode information message is part of a message that is different from the security mode command message: refrain from processing any valid radio bearer downlink ciphering activation time information in the ciphering mode information message and refrain from producing any valid radio bearer uplink ciphering activation time information for the ciphering mode information message, and, generate a response message which includes no valid radio bearer uplink ciphering activation time information configured to be sent through the wireless transceiver.

7. The mobile station of claim 6, wherein the ciphering mode information message that is part of the message that is different from the security mode command message is received as part of a radio network subsystem relocation procedure for the mobile station.

8. The mobile station of claim 6, wherein the one or more processors are further operative to:

fail to receive any valid radio bearer downlink ciphering activation time information in the ciphering mode information message when it is part of the message that is different from the security mode command message.

9. The mobile station of claim 6, wherein the ciphering mode information message is part of the message that is different from the security mode command message and comprises a radio link control (RLC) of a radio bearer for the mobile station useable to reestablished and reset its RLC sequence number reset to zero.

10. The mobile station of claim 6, wherein the valid radio bearer downlink ciphering activation time information comprises Radio Link Control (RLC) sequence numbers.

11. A computer program product, comprising:
a storage medium;
computer instructions stored in the storage medium; and
the computer instructions being executable by one or more processors in a mobile station, the mobile station configurable to operate in a wireless network, for reducing processing time associated with ciphering information by:
receiving a ciphering mode information message;
when the ciphering mode information message is part of a security mode command message: identifying and processing radio bearer downlink ciphering activation time information in the ciphering mode information message, producing radio bearer uplink ciphering activation time information, and, generating a response message configured to be transmittable over the wireless network which includes the valid radio bearer uplink ciphering activation time information; and
when the ciphering mode information message is part of a message that is different from a security code command message: refraining from processing radio bearer downlink ciphering activation time information in the ciphering mode information message, and, not producing an associated radio bearer uplink ciphering activation time, and, generating a response message configured to be transmittable over the wireless network to the non-security-mode-command message which does not include an associated radio bearer uplink ciphering activation time.

12. A computer program product of claim 11, wherein the ciphering mode information message that is part of the message that is different from the security mode command message is received as part of a radio network subsystem relocation procedure for the mobile station.

13. The computer program product of claim 11, wherein the computer instructions are further executable for:
failing to receive any valid radio bearer downlink ciphering activation time information in the ciphering mode information message when it is part of the message that is different from the security mode command message.

14. The computer program product of claim 11, wherein the ciphering mode information message is part of the message that is different from the security mode command message and is a radio link control (RLC) of a radio bearer useable by the mobile station to reset its RLC sequence number reset to zero.

15. The computer program product of claim 11, wherein the valid radio bearer downlink ciphering activation time information comprises Radio Link Control (RLC) sequence numbers.

* * * * *